Oct. 26, 1948.  C. E. WENGER  2,452,170
AIR HEATER FOR MOTOR VEHICLES
Filed Nov. 25, 1946

INVENTOR.
Clifton E. Wenger
BY
R. Lyman Heindel
ATTORNEY

Patented Oct. 26, 1948

2,452,170

UNITED STATES PATENT OFFICE 2,452,170

AIR HEATER FOR MOTOR VEHICLES

Clifton E. Wenger, Detroit, Mich.

Application November 25, 1946, Serial No. 712,136

3 Claims. (Cl. 257—241)

This invention relates to an apparatus for heating air, and specifically it relates to a means of heating air for distribution in and about motor vehicles.

Heaters for motor vehicles rely upon the waste heat of combustion, which is transmitted to the space to be heated either through the circulating liquid from the motor cooling system or through air which is conducted over a hot portion of the engine—usually over a portion of the exhaust pipe. The so-called water-heaters are only effective after the engine has become thoroughly heated, which may not occur for 10 to 15 minutes after the engine is started. They have the further defect of requiring a separate heat-exchange system in which air is drawn over coils containing the warm liquid. Another disadvantage is that the air which is indirectly heated in a hot-water system is not at a sufficiently high temperature, or under sufficient pressure to be used effectively in sleet removal under the conditions frequently encountered in the north temperature zone and at high altitudes.

Hot air heaters respond rapidly, as contrasted with the water heaters, and serve their intended purpose almost as soon as the engine is started, but have suffered from the general defect of being built so as to surround a portion of the exhaust pipe, any defects in which result in conducting directly into the body of the motor vehicle the noxious fumes comprising carbon monoxide, from the combustion of fuel in the engine. In addition, many variations of such heaters heretofore proposed and used have become fouled with air-borne dirt and could not be cleaned conveniently, and were no longer useful for their intended purpose. Hence, in spite of their more practical features, air heaters have been supplanted by the less efficient but generally safer water heaters.

It is an object of the present invention to provide an air heater of compact design capable of providing adequate and instantaneous heat to the body of a motor vehicle, and of providing air at a sufficiently high temperature and under sufficient pressure to keep the windshield clear under sleet-forming conditions and those which normally favor "fogging." A related object is to provide an air heater for motor vehicles which, though deriving its heat from the exhaust system, does not surround the exhaust pipe and has no such connection therewith as to permit leakage of combustion gases into the heated air stream. A further object is to provide such a heater, the heat-exchanger portion of which offers substantially no resistance to the passage of air therethrough. A particular object is to provide such an apparatus in a form which may be attached conveniently to any standard motor vehicle. Other and related objects may appear hereinafter.

The heater of the present invention comprises an enclosed, compact stack of parallel metal plates or "fins" spaced apart sufficiently to permit uninterrupted passage of air therebetween, the housing for which is externally adapted to fit snugly against the exhaust pipe of a vehicle propelled by an internal combustion engine, to transmit heat by conduction through said wall to the radiating elements within the housing. In a preferred form, the housing carries, externally thereof, a saddle-like projection, of concave cross-section adapted to lie snugly against and partially about the exhaust pipe. The new heater, to be described more fully hereinafter, may have other novel and useful features incorporated therein, as will be explained.

The invention may be understood readily by reference to the accompanying drawing, wherein Fig. 1 is an elevation, in partial section, of the simplest modification of the new heater;

Figure 4:
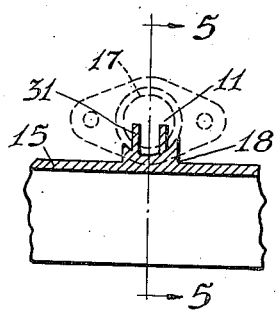
Fig. 4 is a cross-sectional view of a modification of the concave saddle-like heat exchange member.

Referring now to the drawing, the new heater is provided with a blower 10 of any suitable design at the cold air intake, for reasons which will be made apparent. The blower may be electrically driven, from the battery or generator, as illustrated, by a motor 11, or it may be operated by means of a belt drive from the fan or water-pump shafts, as may be most convenient. Blower 10 receives cold air through opening 12 and, by means of rotating blades 13, forces that air through the inlet header pipe 14, which opens into heating chamber 15 containing parallel generally rectangular thin metal plates 16, spaced apart most efficiently from about $\frac{1}{16}$ to $\frac{1}{4}$ inch, disposed vertical to the axis of exhaust pipe 17 and being longitudinally disposed in the direction of flow of air through the apparatus. The thin metal plates 16 extend transversely between and are contiguous with each of two opposed walls (illustrated as though vertical) of housing 15, and receive their heat by conduction through concave saddle-like projection 18, forming a part of the side-wall adjacent exhaust pipe 17. The concavity of projection 18 has a radius of curvature equal to the outside radius of the exhaust pipe 17, so that contact may be maintained between these two members over the entire surface area of said concavity. Chamber 15 may be secured to one side of exhaust pipe 17 by any appropriate means, as by strap-iron clips, but it is preferred to effect the attachment by brazing or welding saddle 18 to pipe 17, to make thermal contact more positive. Plates 16 may be secured by rivets, or by soldering, brazing or welding to spacer bars 19 internally of chamber 15. Beyond chamber 15, in the path of air flow, is discharge header 20 from which connections may be made to the heat distributing means, as through tube 21 containing appropriate dampers 22 for proportioning the discharged and heated air among the various hot air registers or openings about the vehicle.

Figure 2:
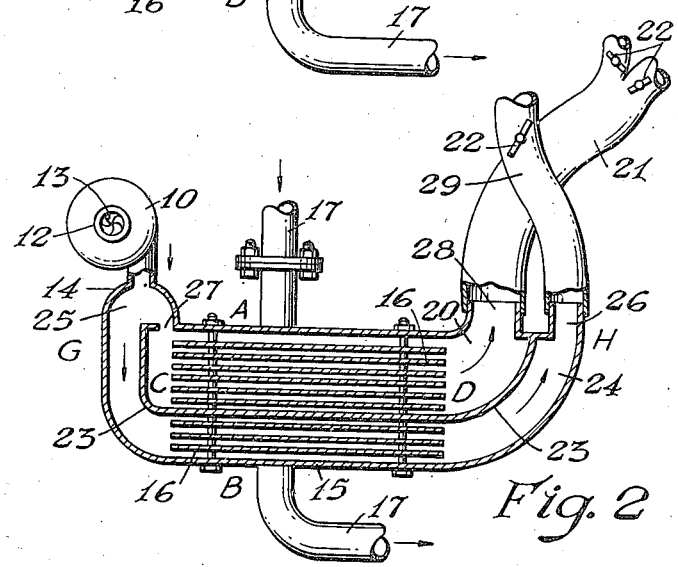
Fig. 2 is a similar view of another modification of the heater intended to overcome certain existing problems.

The modification of the apparatus illustrated in Fig. 2 is particularly adapted to use where at least one of the hot air consuming stations about the vehicle requires air at a greater pressure, or with a higher velocity, than do the other such stations. Such a situation exists in those vehicles having one or more slits adjacent and on the weather side of the windshield for frost or sleet removal, as illustrated, for example, in U. S. Patent No. 2,258,922 issued to Ray L. Albee. Referring to Fig. 2, the inlet header pipe 14 is provided with an internal partition 23, which extends through chamber 15 and divides the discharge end of the apparatus into two discharge headers 20 and 24. Partition 23 is so positioned as to provide a larger inlet 25 and a smaller outlet 26 on the side intended to deliver air at the higher velocity than the corresponding inlet 27 and outlet 28 on the intended lower velocity side of the apparatus. This arrangement, augmented by the normal thermal expansion of the driven air passing through the heater, may be used to provide air at any desired velocity emerging from outlet 26 for delivery through tube 29 while maintaining a normal flow of air to the hot air registers through tube 21.

Figure 6:
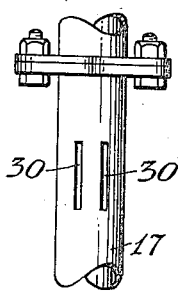
Fig. 6 is a view of a length of exhaust pipe especially slotted to co-operate with the heat exchange member of Fig. 4.
Figure 3:
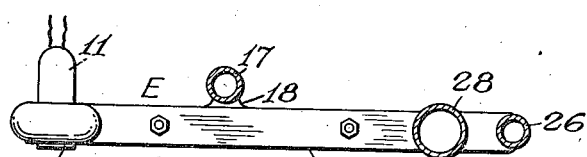
Fig. 3 is a plan view of the heater of Fig. 2.
Figure 5:
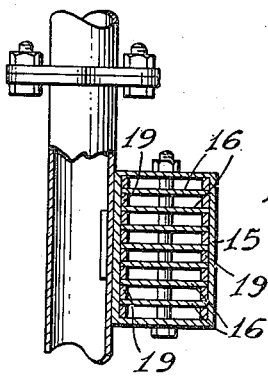
Fig. 5 is a vertical section through the apparatus as though taken along line 5—5 of Fig. 4.

Instead of using the plain saddle 18 illustrated in Fig. 3, there may be used the modification thereof shown in Figs. 4 to 6. In this case, a section of exhaust pipe 17 is provided with one or more slots 30 to receive a like number of snugly fitting tenons 31 projecting from the concave face of saddle 18. When assembled, heating chamber 15 not only receives heat conducted from the walls of pipe 17 through saddle 18, but also from the tenons 31 which extend into the hot center of the exhaust stream in pipe 17. This arrangement, while not essential, is somewhat more effective than the other, simply because of the greater rapidity with which it raises the impelled air stream to an effective temperature for heating the vehicle.

Since the housing of chamber 15 does not enclose exhaust pipe 17 in either of the modifications disclosed, and provides no opening for communication between the exhaust gases and the air stream being heated, there are none of the usual hazards incident to leakage of exhaust gas into the heated air stream. Because of the simplicity of the connection, the heater is readily removed from the exhaust pipe if that should prove necessary, and may be as readily assembled on another vehicle, change being made only as to the radius of curvature of the concavity of saddle 18, if the new exhaust pipe is of a different size than that for which it was originally designed.

Various minor changes from the particular arrangement and disposition of the parts here illustrated, which may prove necessary to fit the available space in different vehicles, are contemplated as part of the invention, as such changes and the manner of making them are within the skill of a mechanic familiar with this disclosure and with motor accessory installations.

Figure 1:
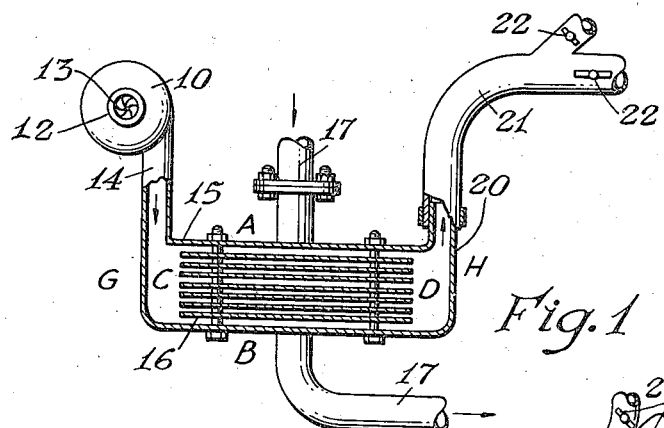

In a typical installation, the dimension A—B is 5 inches, the dimension C—D is 6 inches, and the dimension E—F is 2.5 to 3 inches. The plates 16 are thus about 2.5×6 inches, and are typically spaced about 0.125 inch apart and number from 20 to 40 in heaters of the type illustrated in Figs. 1 and 2. Inlet port 25 may be about 1.75 inches in diameter while that of inlet 27 may be 1.25 inches. Outlet port 26 may be from 1.0 to 1.25 inches in diameter, while port 28 may be somewhat larger, or from 1.25 to 1.75 inches. Overall length G—H is easily kept to from 10 to 12 inches, in automobile heaters. It is to be understood, of course, that these specific dimensions are illustrative, and that the invention is not limited thereto. From the combustion characteristics of the engines used, manufacturers of the new heaters can compute readily the necessary and sufficient sizes of heater and number of plates for any make of vehicle. It has been found convenient and sufficient to provide from about 4 to 8 or 10 square inches of contact between the concave saddle and the exhaust pipe.

I claim:

1. An air heater for use in and about closed vehicles propelled by an internal combustion engine, comprising in succession, a blower, an inlet header, an enclosed heating chamber, and a discharge header, the said headers and heating chamber being longitudinally divided into two separate air passages, one of which has a relatively large inlet and a relatively small outlet as compared with the other such passage, the so-divided heating chamber having disposed in each compartment thereof a plurality of thin metal plates, parallel to one another, said plates being spaced apart sufficiently to permit uninterrupted passage of air therebetween, and extending transversely across the heater and being in heat conducting contact with opposed walls thereof, one of which is externally adapted to fit snugly against the exhaust pipe of such a vehicle to transmit heat by conduction through said wall to the said thin metal plates.

2. An air heater for use in and about closed vehicles propelled by an internal combustion engine, comprising in succession, a blower, an inlet header, an enclosed heating chamber, and a discharge header, the said headers and heating chamber being longitudinally divided into two separate air passages, one of which has a relatively large inlet and a relatively small outlet as compared with the other such passage, the so-divided heating chamber having disposed in each compartment thereof a plurality of thin metal plates, parallel to one another and vertical to or parallel to the axis of the exhaust pipe of the motor vehicle for which the heater is adapted, said plates being spaced apart sufficiently to permit uninterrupted passage of air therebetween, and extending transversely across the heater and being in heat conducting contact with opposed walls thereof; and, externally of said enclosed heating chamber and attached thereto, a saddle-like projection presenting an open cylindrically concave face having a radius of curvature approximating that of the external surface of a motor vehicle exhaust pipe, adapted to fit snugly against such a pipe and to transmit heat therefrom by conduction through the chamber wall to the said thin metal plates.

3. In a motor vehicle having an internal combustion engine and an exhaust pipe, the combination of said exhaust pipe having at least one slot therein and an air heater secured against the exhaust pipe adjacent said slot comprising in succession, a blower, an inlet header, an enclosed heating chamber, a discharge header, and means for conducting heated air from the heater to at least one hot air register about said vehicle, said heating chamber having disposed therein a plurality of thin metal plates, parallel to one another and vertical to the axis of the exhaust pipe of the motor vehicle for which the heater is adapted, said plates being spaced apart sufficiently to permit uninterrupted passage of air therebetween, and extending transversely across the heater and being in heat conducting contact with opposed walls thereof; and, externally of said enclosed heating chamber and attached thereto, a saddle-like projection presenting an open cylindrically concave face having a radius of curvature approximating that of the external surface of the exhaust pipe and, protruding therefrom into the slotted exhaust pipe, tenons of a size and number to fill each said slot.

CLIFTON E. WENGER.

REFERENCES CITED

The following references are of record in the file of this patent:

UNITED STATES PATENTS

| Number | Name | Date |
|---|---|---|
| 1,755,924 | Keagle et al. | Apr. 22, 1930 |
| 1,803,436 | Otwell | May 5, 1931 |
| 1,905,487 | Modine | Apr. 25, 1933 |
| 1,968,214 | Lonskey | July 31, 1934 |